Figure 1:
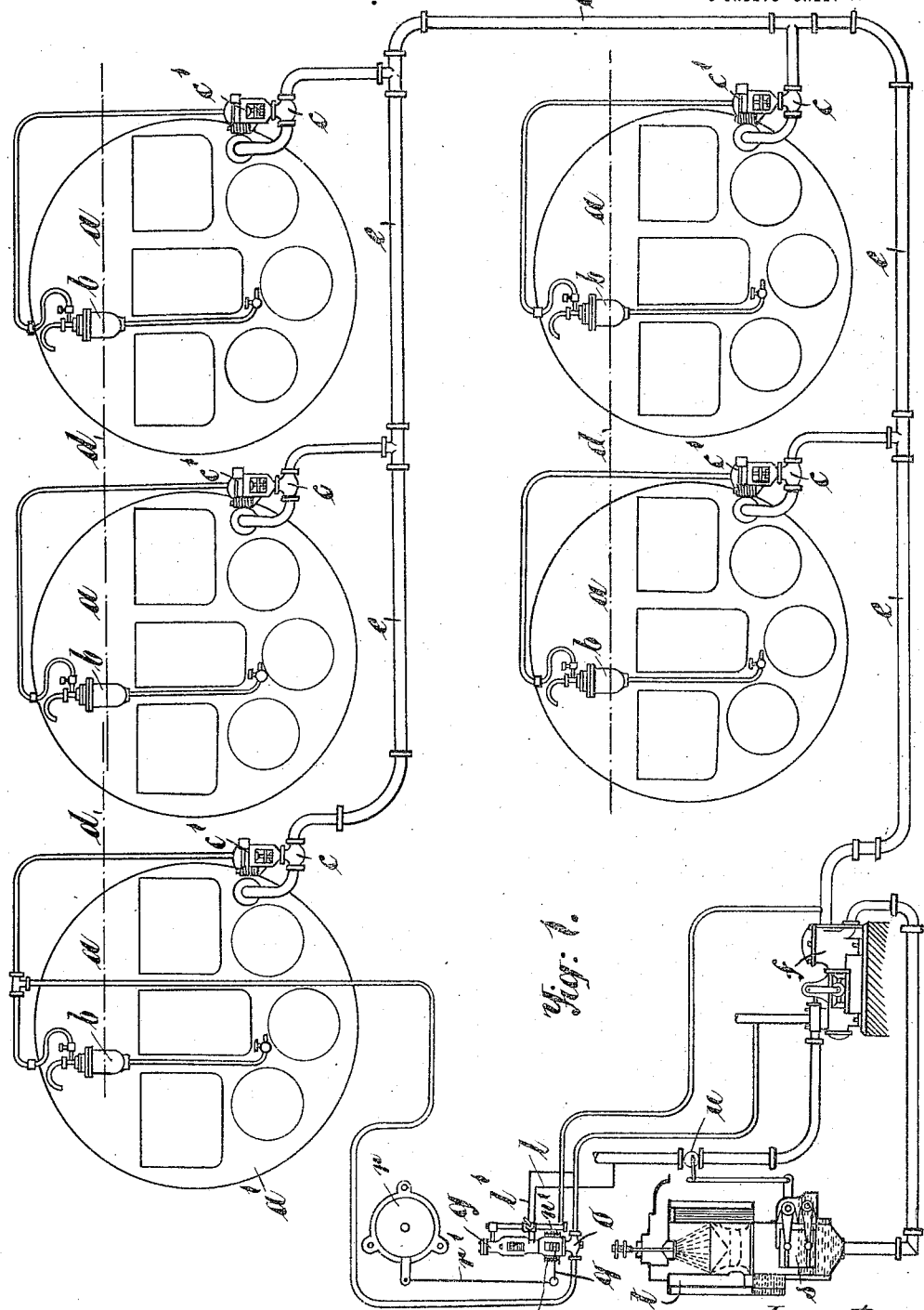

A. R. TRIST.
AUTOMATIC LIQUID FEEDING APPARATUS FOR USE WITH STEAM BOILERS AND LIKE PURPOSES.
APPLICATION FILED MAY 5, 1915.

1,191,372.

Patented July 18, 1916.
3 SHEETS—SHEET 1.

Inventor:
Arthur R. Trist,
by William Wallace White Atty.

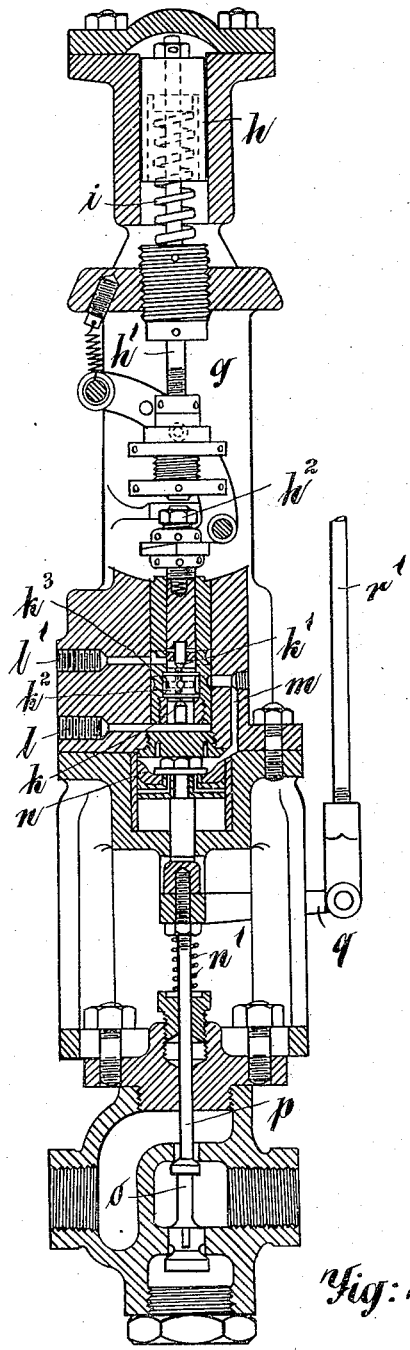
Fig: 2.

A. R. TRIST.
AUTOMATIC LIQUID FEEDING APPARATUS FOR USE WITH STEAM BOILERS AND LIKE PURPOSES.
APPLICATION FILED MAY 5, 1915.
1,191,372.
Patented July 18, 1916.
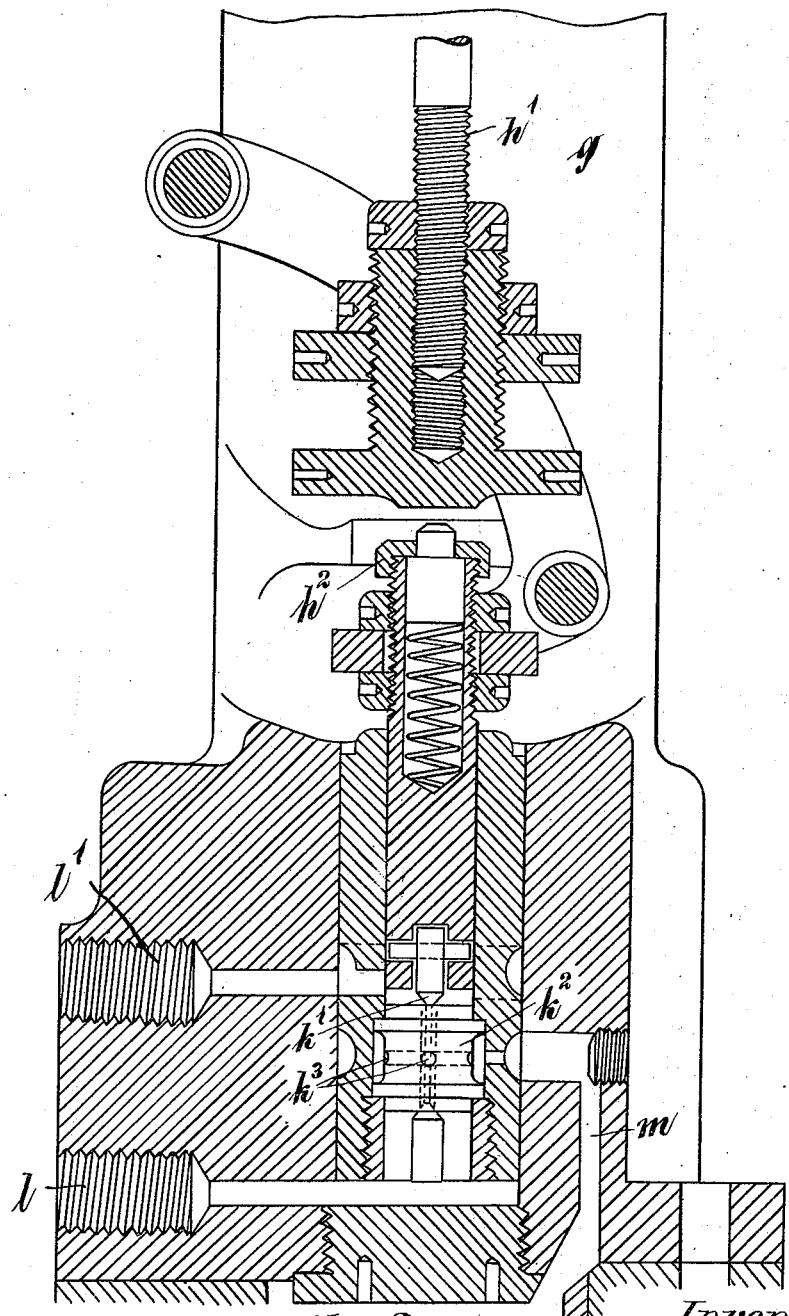
Fig: 3.
Inventor:
Arthur R. Trist,
by
Atty.

UNITED STATES PATENT OFFICE.

ARTHUR RONALD TRIST, OF LONDON, ENGLAND.

AUTOMATIC LIQUID-FEEDING APPARATUS FOR USE WITH STEAM-BOILERS AND LIKE PURPOSES.

1,191,372.	Specification of Letters Patent.	Patented July 18, 1916.

Application filed May 5, 1915. Serial No. 26,136.

*To all whom it may concern:*

Be it known that I, ARTHUR RONALD TRIST, a subject of the King of Great Britain and Ireland, residing at 4 Lloyds avenue, in the city of London, England, have invented new and useful Improvements in and Relating to Automatic Liquid-Feeding Apparatus for Use with Steam-Boilers and like Purposes, of which the following is a specification.

This invention relates to automatic liquid feeding apparatus for use with a battery of boilers or like apparatus for maintaining as far as possible a constant water level irrespective of the duty demanded from any unit or combination of units.

The object of the invention is the provision of means for dealing with the conditions which obtain when a battery of boilers are fed by a feed pump from a hot well of a condensing engine, feed water heater or other device of limited capacity and in which the rate of movement of the pump is controlled by the level of water in the hot well, feed heater or other storage device. It is customary now to control the feed check valve opening by a power device controlled in turn by a device controlled by the water level in the boiler and to control the rate of movement of the pump by using the pump line pressure to regulate the admission of steam or application of power to the pump. When however a battery of two or more boilers has to be dealt with each boiler having an automatically operated feed check valve controlled by the water level, it is quite possible to have the proper complement of water in each boiler, the check valves closed and the pressure in the feed pipe line so augmented that the pump would be unable to compete with such pressure and would therefore be brought to a standstill. If this happened it is certain that the hot well, or the feed heater or other device would be flooded or overcharged with water and disastrous consequences ensue. This condition of things might be brought about by too great a supply of feed make up, and if such is the case, it is desirable that the pump should continue to run and that some signal or warning should be automatically made to indicate abnormal conditions and the necessity for immediate attention.

To carry the invention into effect each of the boilers is fitted with a water level control device adapted to regulate by fluid pressure the position of the feed check valve on each boiler and the battery of boilers is so arranged that one or more boilers form a unit which shall act as a reserve feed water storage for the installation and as a sentinel for the remainder of the boilers in such a way that when the remainder of the boilers refuse to take feed water owing to being full then the sentinel unit will take the feed water until a full or nearly full complement is obtained when a warning signal will be automatically given that attention is required on the part of the attendant. To effect this I arrange a fluid pressure controlled arrangement in conjunction with the feed pipe line which acts against a yielding resistance and is adapted to control a valve governing the retention or release of the steam disposed between the water level controlled valve and the power device controlling the feed check valve on the sentinel boiler. The effect of this arrangement is that the steam pressure admitted by the water level controlled valve to the power device of the feed check valve to close the same owing to the water level having attained the proper height, is allowed to leak away and thus cause the feed check valve of the sentinel unit to open and remain so until the surplus thus permitted to pass such valve is no longer required so to do. I make the movement of the fluid pressure controlled arrangement to act at a pressure above that of the larger part of the boiler installation and therefore the latter has to be satisfied with feed water first before the sentinel unit is asked to open to take the surplus.

The invention consists in the combination of devices in a boiler installation or the like whereby the functions hereinbefore described are carried into effect.

In order that the invention may be the better understood I will now proceed to describe the same with relation to the accompanying drawings, reference being had to the letters and figures marked thereon.

Like letters refer to like parts in the various figures, in which:—

Figure 1 diagrammatically illustrates a battery of boilers showing the application of my improved feed regulating system. Fig. 2 shows in section one form of fluid pressure controlled device adapted to carry out my invention. Fig. 3 shows the central part of Fig. 2 drawn to an enlarged scale.

Referring to Fig. 1 each of the boilers $a$ is fitted with a water level control device $b$ of known construction which is adapted to control by fluid pressure the feed check valve $c$ by means of a power device $c'$ on each boiler. One or more of the boilers $a$ form a unit $a'$ which acts as a reserve feed water storage for the battery and as a sentinel for the remainder thereof. The dot and dash line $d$ through each of the boilers $a$ represents the water level therein and as the water level $d$ in the boiler $a'$, acting as the sentinel unit, is higher than the water levels in the remainder of the boilers $a$ it is obvious that the feed check valve $c$ on the boiler $a'$ will remain open after the feed valves $c$ on the boilers $a$ have been closed by their respective water level control devices $b$; as a consequence the pressure in the feed main $e$ will remain approximately normal and will not appreciably rise until the water in the boiler $a'$ has reached the higher level to which the water level control device $b$ is adjusted. After the water has reached the water level $d$ in the boiler $a'$ the feed check valve $c$ will be closed by the water level control device $b$ associated therewith and the pressure in the feed main $e$ will rise.

In order to prevent the pressure in the feed main $e$ from overcoming the delivery pressure of the feed pump $f$, I arrange a fluid pressure controlled device $g$ in conjunction with the feed main $e$ constructed so that the fluid pressure acting against a yielding resistance controls a valve governing the retention or release of the steam disposed between the water level control device $b$ and the power device $c'$ actuating the feed check valve $c$ of the sentinel unit. The effect of this arrangement is that the steam pressure admitted by the water level controlled valve $b$ to the power device $c'$ of the feed check valve $c$ to close the same owing to the water level $d$ in the sentinel unit $a'$ having attained the proper height, is allowed to leak away and thus cause the feed check valve $c$ of the sentinel unit $a'$ to open and remain so until the surplus thus permitted to pass such valve $c$ is no longer required so to do.

The fluid pressure controlled device $g$ has a piston $h$ acting against a spring $i$ as a yielding resistance. The piston $h$ is attached to a piston rod $h'$ whose end contacts with a plunger $h^2$; the lower end of the said plunger $h^2$ carries the valves $k$ $k'$ which are adapted to engage with the double seat member $k^2$. Upon the depression of the piston $h$ by the water pressure conveyed from the feed main $e$ through the pipe $e'$ the valve $k$ is moved from off the lower seat of the member $k^2$ while the valve $k'$ engages the upper seat thereof. When valves $k$ and $k'$ are in this position steam passes from the steam pipe $f'$ of the pump by the pipe $f^2$ through the inlet $l$ past the valve $k$ into the interior of the member $k^2$ and from thence through the holes $k^3$ into the passage $m$. The passage $m$ is in communication with the cylinder $n'$ which is provided with a piston $n$ therefore the steam after passing through the passage $m$ acts on the upper side of the piston $n$ depressing the same and opening the double beat valve $o$ thereby relieving the feed check valve power device of its controlling pressure and allowing the feed check valve $c$ to open.

When the water level $d$ in the sentinel unit $a'$ is lowered by evaporation or otherwise the water level controlled device $b$ cuts off steam from the power device $c'$ actuating the check valve $c$ associated therewith and simultaneously the pressure in the feed main $e$ again becomes normal thereby allowing the spring $i$ to reassert its preponderance, close the valve $k$ and open the valve $k'$ whereupon the pressure in the cylinder $n'$ is relieved through the passage $m$, holes $k^3$, interior of the member $k^2$ past the valve $k'$ into the passage $l'$ from which it escapes by the pipe $l^2$ connected to the exhaust pipe $f^3$ of the pump $f''$; the piston $n$ thereupon returns to its upper position, under the influence of the spring $n'$, and closes the double beat valve $o$.

The spindle $p$ carries an arm $q$ which operates an alarm; for example the bell $r$ by means of a rod $r'$ or similar device, thus indicating to the attendant in charge that the sentinel unit $a'$ is fully charged and that the feed make up should be reduced.

As is usual in modern practice the feed pump $f$ is controlled by a float $s$ immersed in the feed water heater $t$, the said float $s$ being adapted to control the steam supply to the pump $f$ by means of the valve $u$.

When the warning is given steps must be effected by the attendant to restore the balance of the working conditions which the warning has shown to have been necessary.

It is obvious that a tank or similar receptacle may be installed in place of the boiler $a'$ and further that the system can be connected to the hot well direct without the interposition of the feed water heater; the float $s$ under such circumstances being adapted to be controlled in its movement by the level in the said hot well.

I claim:—

1. Apparatus for automatically controlling the supply of feed water to steam boilers or the like comprising in combination a battery of boilers or the like divided into two sets, a main set and a sentinel set, each boiler being provided with means for automatically controlling the supply of feed water by the water level in said boiler, a pumping device, a feed main from said pumping device common to all the boilers, a fluid pressure power device controlled by the water level in the sentinel set adapted to control the supply of feed water up to a predetermined pressure to said sentinel set, a power device having a yielding resistance connected to the feed main, a device operated by said power device adapted to relieve the pressure of the said fluid pressure power device controlling the feed water supply to the sentinel set when the said predetermined pressure is exceeded and an alarm device adapted to operate when said increase of pressure has been set up.

2. Apparatus for automatically controlling the supply of feed water to steam boilers or the like comprising two or more boilers or reservoirs, a water level controlled device on each boiler or reservoir for regulating the supply of feed water thereto by the medium of fluid pressure, a pumping device common to all the boilers or reservoirs, a power device having an adjustable yielding resistance operated by the pressure of feed supply from the pump, a valve or the like operated by said power device in conjunction with the fluid pressure for controlling the feed water supply to one or more boilers or reservoirs acting as a sentinel unit and adapted to allow a certain amount of the fluid pressure to leak away when the water in the sentinel unit has reached a level greater than that in any of the other boilers of the battery or installation, an alarm device actuated by the said power device, when the predetermined pressure has been reached, a hot well or feed water reservoir for containing the feed water, a movable device controlled by the level of the water in said hot well and controlling means on said pump operated by the said movable device.

In testimony whereof I have signed my name to this specification in the presence of two subscribing witnesses.

ARTHUR RONALD TRIST.

Witnesses:
WESLEY WILSON,
CHAS. R. BALLOUGH.

Copies of this patent may be obtained for five cents each, by addressing the "Commissioner of Patents, Washington, D. C."